No. 638,596. Patented Dec. 5, 1899.
M. E. REISERT.
SCALE.
(Application filed Dec. 24, 1897.)
(No Model.) 4 Sheets—Sheet 1.

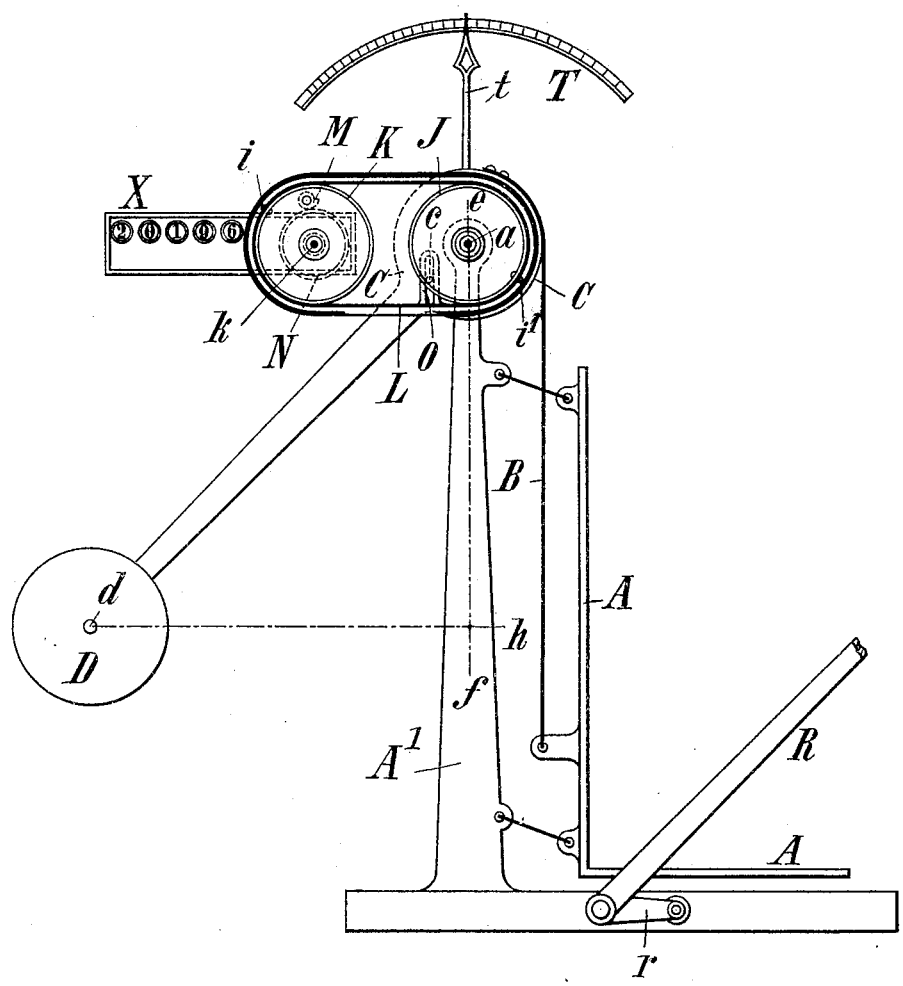

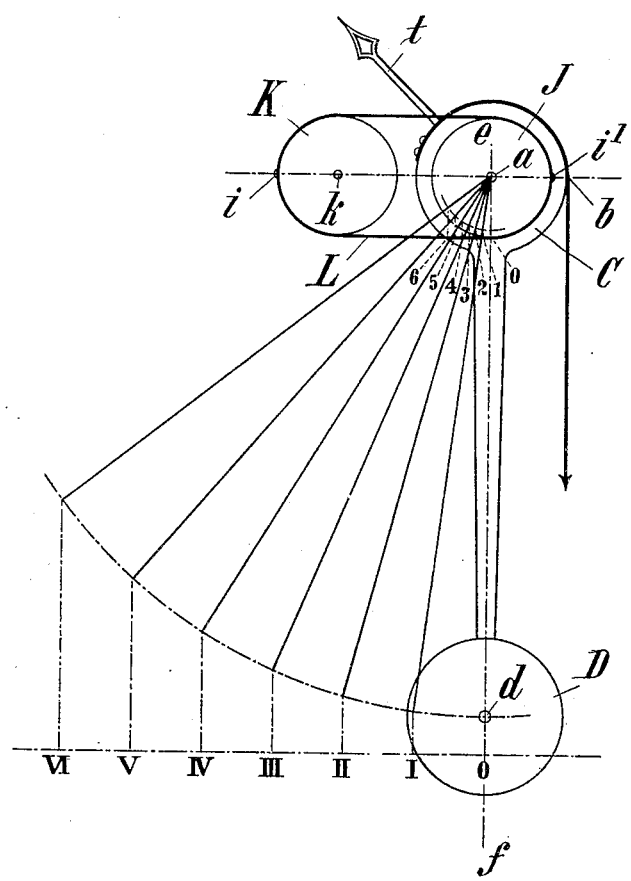

No. 638,596. Patented Dec. 5, 1899.
M. E. REISERT.
SCALE.
(Application filed Dec. 24, 1897.)
(No Model.) 4 Sheets—Sheet 4.

UNITED STATES PATENT OFFICE.

MICHAEL EDUARD REISERT, OF HENNEF-ON-THE-SIEG, GERMANY.

SCALE.

SPECIFICATION forming part of Letters Patent No. 638,596, dated December 5, 1899.

Application filed December 24, 1897. Serial No. 663,380. (No model.)

*To all whom it may concern:*

Be it known that I, MICHAEL EDUARD REISERT, a subject of the German Emperor, and a resident of Hennef-on-the-Sieg, in the German Empire, have invented certain new and useful Improvements in Scales, (for which I have obtained a patent in Germany, No. 65,583, dated September 13, 1891,) of which the following is a specification.

The present invention relates to weighing apparatus or scales poising the loads by means of a weighted pendulum; and it consists more especially in an improved device in such scales for transmitting the amplitudes of the weighted pendulum or lever to a counting or recording device in order to exactly record or sum the whole amounts of subsequent weighing results.

In order that my invention may be fully understood, I will proceed to describe it with reference to the accompanying drawings, in which—

Figure 1:
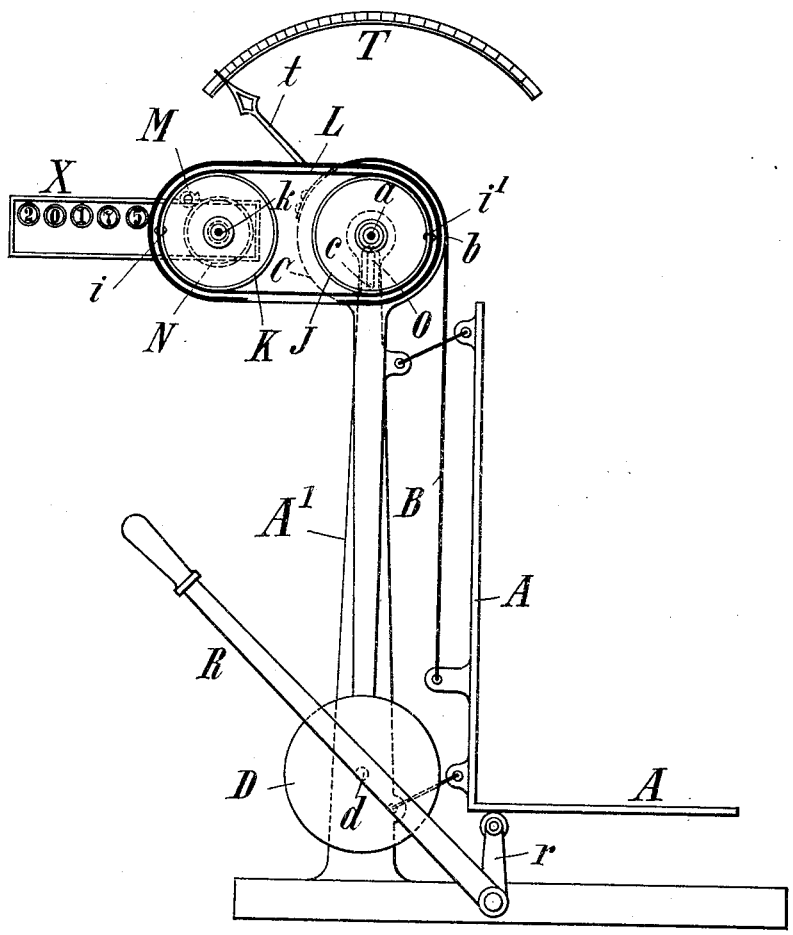
Figure 5:
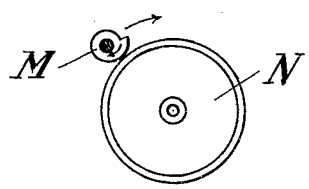
Figure 4:
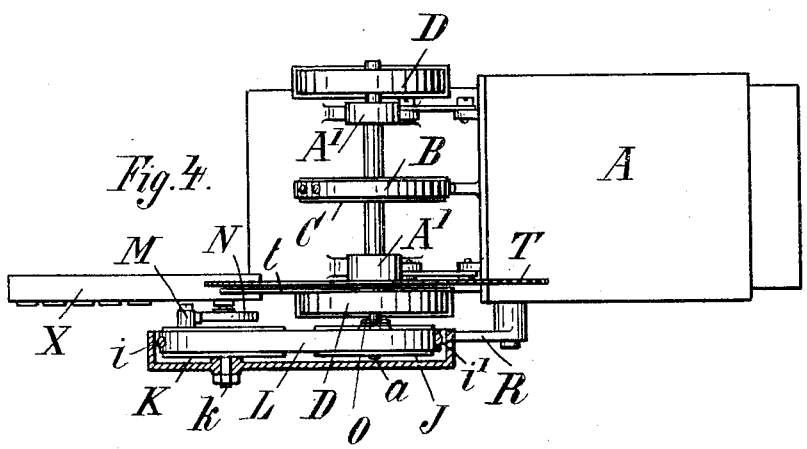

Figure 1 is a side elevation, partly in section, of my improved scale. Fig. 2 is a similar view showing the said improved scale in the position of use, and Fig. 3 is a diagram illustrating the coöperation of the weighted lever or pendulum and of the recording device. Fig. 4 is a top view of the scale. Fig. 5 shows a detail on an enlarged scale.

Similar letters refer to similar parts throughout the several views.

The platform A upon which the load to be weighed is placed is suspended by means of a cord or strap B from a roller C, capable of being turned on a bolt or pivot $a$, carried by the scale-post A'. Rigidly connected with the roller or drum C is a weighted lever or pendulum D, which when the scale is at rest hangs down in vertical direction, as shown in Fig. 1. When a load is placed upon the platform A, the downward motion of the latter causes the strap B to partially wind itself off from the drum C, so that this drum turns correspondingly on its pivot $a$, thereby causing the pendulum D to occupy an inclined position, Fig. 2.

The radius of the drum C is represented by the distance $ab$.

$d$ designates the center of gravity of the pendulum D. The horizontal distance $dh$ of the said center of gravity from the vertical line $ef$ passing through the center of the drum C represents the leverage of the pendulum. The load resting upon the platform A is therefore always proportionate to the distance $dh$, so that when this distance is one, two, three, or four times as long as the radius $ab$ the load will be also one, two, three, or four times as heavy as the pendulum D. The problem to be solved is therefore to transmit the horizontal distances $dh$ proportionate to the weight of the load resting at the time upon the platform to a recording device or counter in such a manner that the forward movements or advances of the counter are also proportionate to the corresponding horizontal distances $dh$, and consequently to the weight of the loads. For this purpose a loose pulley J is arranged on the bolt or shaft $a$. Besides this pulley there is supported a second pulley K, fastened on a suitable bolt or shaft $k$. Both of these pulleys K and J are connected with each other by means of an endless strap or cord L, which is firmly attached to the said pulleys at $i$ and $i'$, respectively. The endless strap L carries a slotted or bifurcated post O, which is engaged by a pin $c$, fixed to the drum C. When the pendulum D is brought by a certain load of the scale to a corresponding inclined position, the lower part of the endless strap L is advanced a certain distance by means of the pin $c$, which while sliding upward the slotted post O carries along the strap L also when the parts of the scale return back to their initial positions. The pulley K is provided with a suitable cam M or a like means, which acting upon a wheel or disk N (see Figs. 4 and 5) rotates the latter forward each time the pulley K is rotated forward by the endless strap L, the angular movement of the pulley K and the disk N being thus equal. When the pulley K after the weighing operation has been finished returns under the influence of the reoscillating pendulum into its position of rest, as already described above, the cam M releases the disk N, so that the latter remains in the position occupied. The movements or rotations of the disk N are transmitted in a usual manner to a suitable counter or recording device X by means of a gearing adapted for this purpose.

From Fig. 3 it will be readily understood that the distances O1 O2 O3 O4, through which the strap or belt L is displaced at a time, are exactly proportionate to the distances OI OII OIII OIV—that is to say, to the respective actual lever-arms of the pendulum D; but as these lever-arms are proportionate to the corresponding weights of the loads on the platform A, the belt L and the counter X, respectively, are always advanced proportionate to the said weights or loads, the amounts of which are thus added automatically to the sum of the weights previously recorded by the counter. The operator is therefore enabled to read off on the counter at every time the total amount or sum of the loads weighed by the scale. Every single load or weight may, moreover, be indicated on a separate graduated scale or dial T by a pointer $t$, rigidly attached to the drum C.

The operation of a scale provided with my improved device is as follows: After the load to be weighed is placed upon the platform A the lever R, supporting the latter with its arm $r$, is reversed from the position Fig. 1 into the position Fig. 2. The downward motion of the thus-released platform effects a lateral oscillation of the pendulum D, and thereby a corresponding operation of the recording device, in the manner above described. After the weight of this load is properly recorded the lever R is turned back into its initial position and the load just weighed removed from the platform in order to be replaced by another load to be weighed.

It needs no further explanation that the platform may be replaced by a hook when required and that also the arrangement of the slotted post O and pin $c$ may be reversed.

Having fully described my invention, what I claim, and desire to secure by Letters Patent, is—

1. In scales, the combination with a platform, a pendulum and a drum connected with said platform and pendulum, of a loose pulley concentric with said drum and receiving motion therefrom, and a second pulley receiving motion from the first-mentioned one and adapted to communicate its motion to a registering mechanism, substantially as set forth.

2. In scales, the combination with the platform and pendulum and a drum connected therewith, of a loose pulley adapted to receive motion from the drum, a second pulley adapted to receive motion from the first, and an engaging device on said second pulley engaging and operating an indicating mechanism, substantially as described.

3. The combination with the pendulum-weight, its drum C provided with the slotted post O, the pulley J loose on the shaft of drum C and provided with a pin $c$ projecting into the slot of said post, the shaft $k$, the disk K loose thereon and belted to disk J, and a cam M or the like, carried by said disk J, of a disk N rigidly secured on an operating-shaft $k$ of a registering mechanism and adapted to be revolved by cam M, substantially as and for the purpose set forth.

4. In scales, the combination with the platform, a pendulum, and a drum connected therewith, of a loose pulley concentric with the drum, a second loose pulley belted to the first, a slotted post on the belt between the two pulleys, a pin on the drum engaging the slot in the post to transmit motion to the pulleys, and a cam on the second pulley adapted to move the operating-wheel of an indicating mechanism, substantially as and for the purpose set forth.

In testimony that I claim the foregoing as my invention I have signed my name, in presence of two witnesses, this 11th day of December, 1897.

MICHAEL EDUARD REISERT.

Witnesses:
  WILLIAM H. MADDEN,
  KÄTCHEN STENZ.